April 7, 1964 — H. KERNS — 3,127,846
ARTIFICIAL BLOOD PUMP MEANS
Filed Feb. 16, 1960 — 3 Sheets-Sheet 1

INVENTOR.
BY Harry Kerns

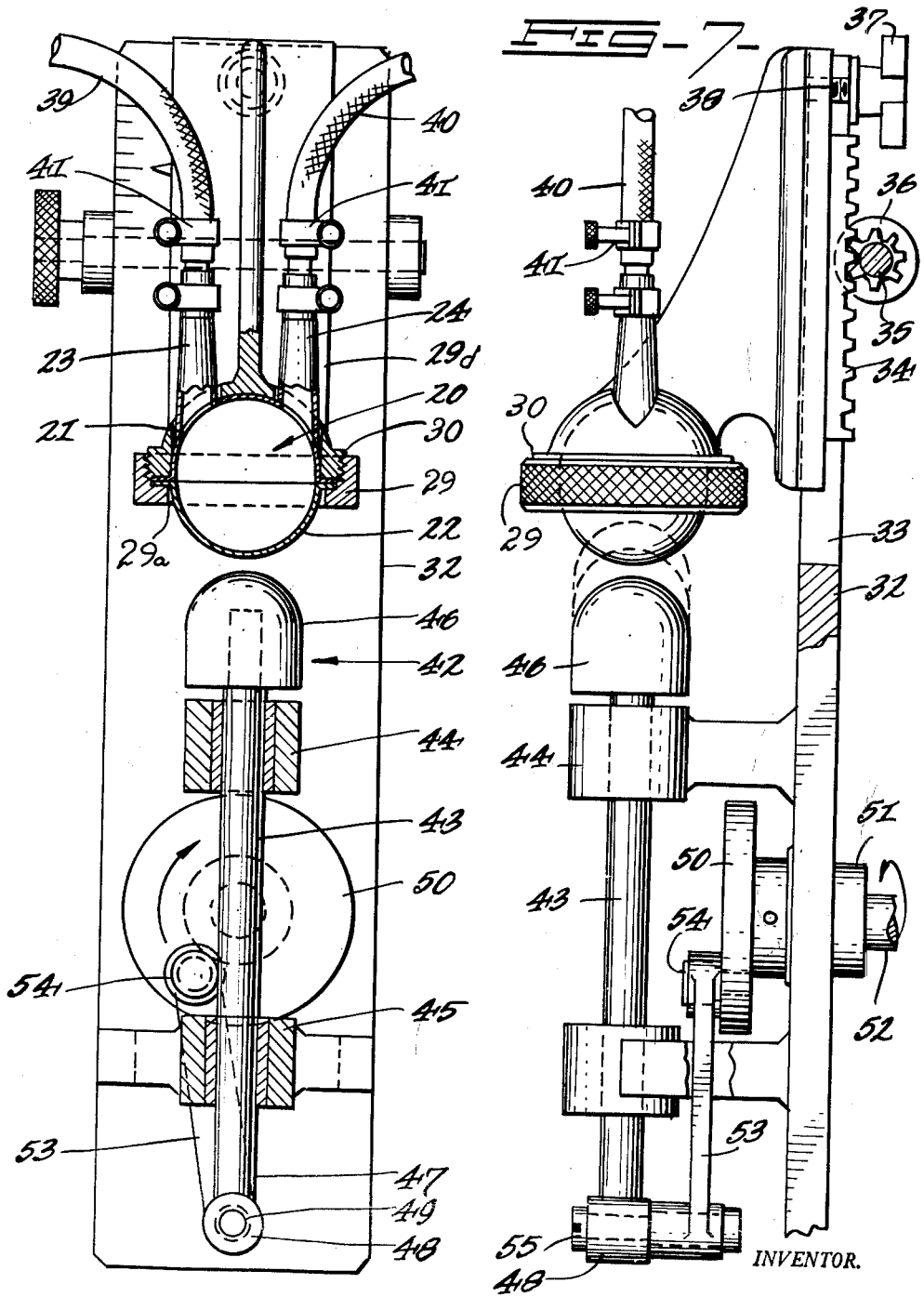

April 7, 1964   H. KERNS   3,127,846
ARTIFICIAL BLOOD PUMP MEANS
Filed Feb. 16, 1960   3 Sheets-Sheet 3
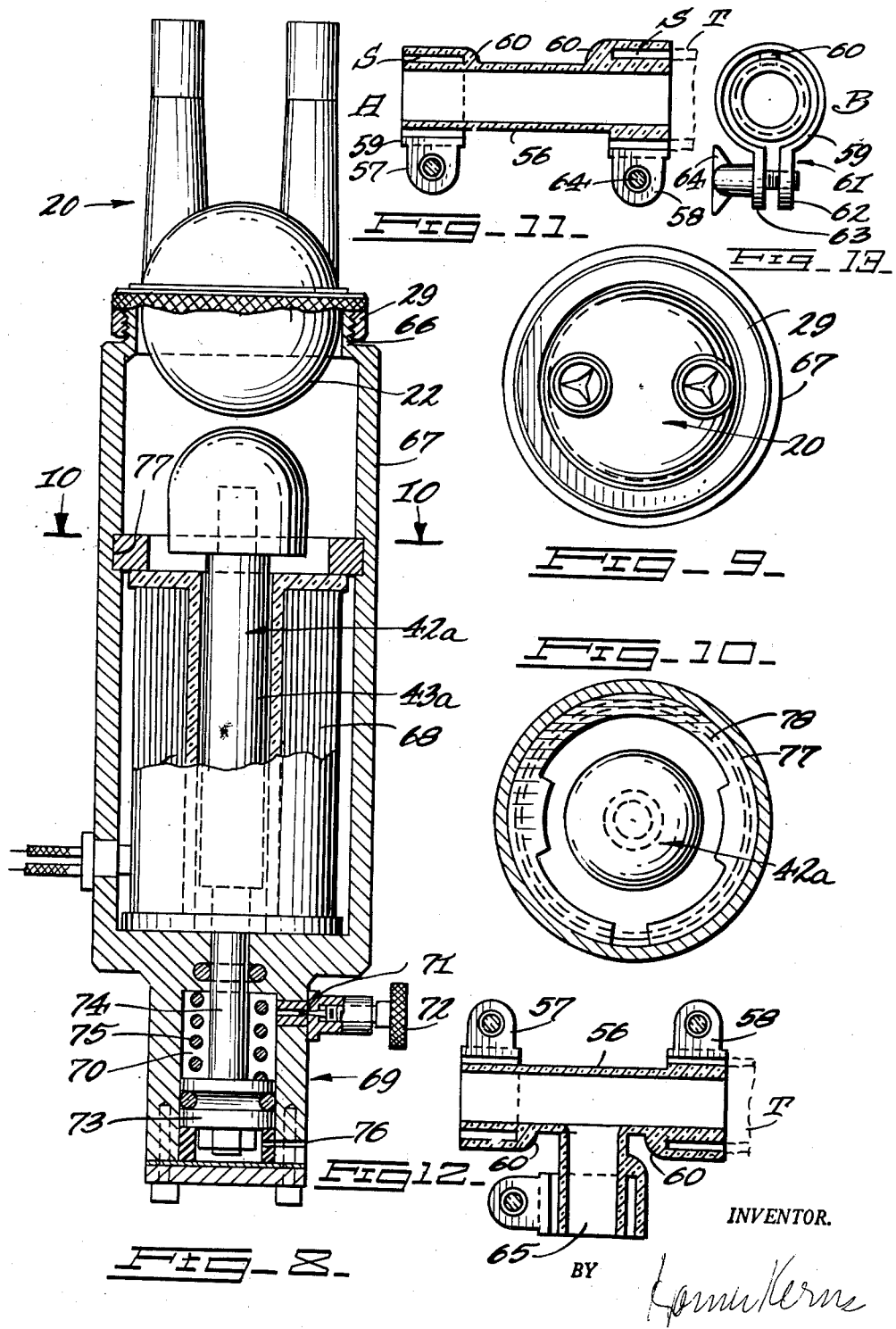
INVENTOR.
Harry Kerns
BY 3,127,846
ARTIFICIAL BLOOD PUMP MEANS
Homer Kerns, New York, N.Y.
(10 Holder Place, Forest Hills, N.Y.)
Filed Feb. 16, 1960, Ser. No. 9,070
2 Claims. (Cl. 103—152)

This invention relates to devices for pumping blood and more particularly to artificial hearts for recirculating blood during emergency operations.

This applicant is aware of the existence of several devices already in use for recirculating blood. The latter are heavy, cumbersome pieces of machinery, complicated in their operation and requiring the constant attendance of specially trained personnel. One object of this invention is to provide a light, simple and safe to operate artificial heart to be operated by non-trained personnel such as the patient himself.

Another object of this invention is to provide an artificial heart formed completely out of flexible plastic material and means to recirculate the blood from the heart into the patient's blood stream.

A further object of this invention is to provide an artificial heart consisting of a hollow-shaped spherical housing with a pair of tubular connections leading therefrom, one providing an inlet and the other an outlet for the blood, and each provided with a one way valve to permit the entry or the exhaust of blood from the artificial heart.

An additional object of this invention is to provide an artificial heart with a prime mover and means to operate the heart with a rhythmic pulsing motion simulating the pulse of the human heart.

Other and additional objects will be seen as the description of this specification proceeds.

Referring to the figures:

FIG. 6 is a front elevation of the mounting frame showing the artificial heart partly broken away.

FIG. 7 is a side elevation of FIG. 6.

FIG. 8 is a modification showing the artificial heart and a solenoid armature to operate the heart.

FIG. 9 is a top elevation of FIG. 8.

FIG. 10 is a section on the line 10—10 of FIG. 8.

FIG. 11 is a section through a clamping fixture.

FIG. 12 is a section through a fixture provided with an elbow.

FIG. 13 is an end view of FIG. 11.

Figure 1:
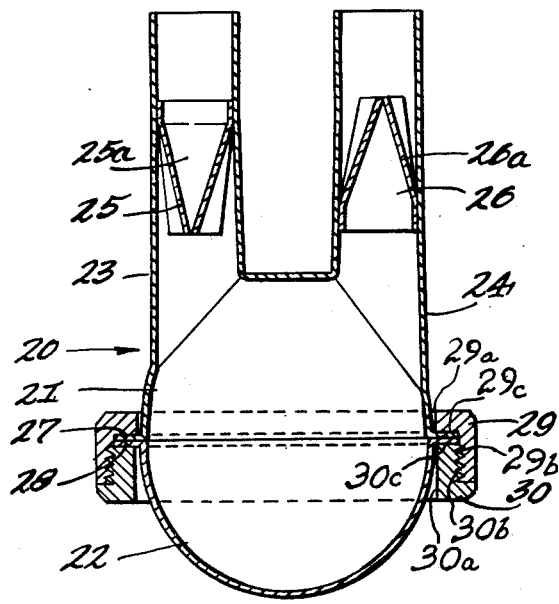
FIG. 1 is a vertical sectional view through the artificial heart showing the valves and other pertinent details.
Figure 3:
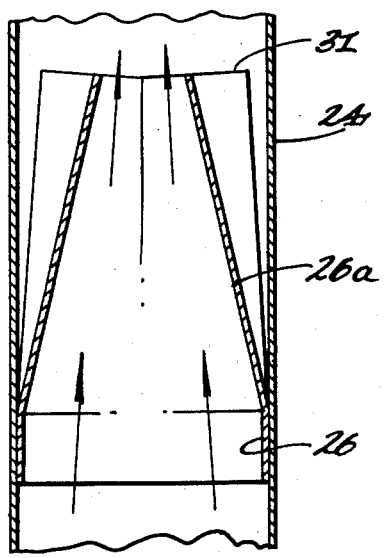
FIG. 3 is an enlarged section through one of the valves showing one valve in open position.
Figure 2:
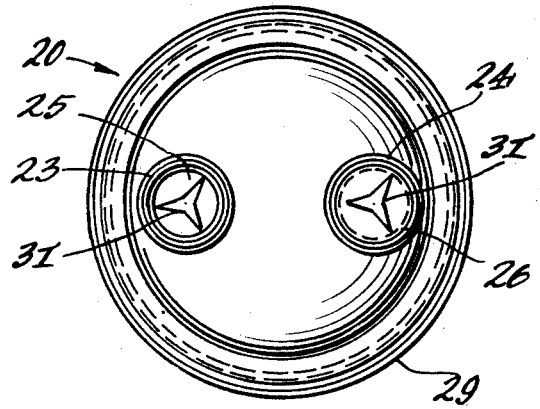
FIG. 2 is a top elevational view of FIG. 1.
Figure 4:
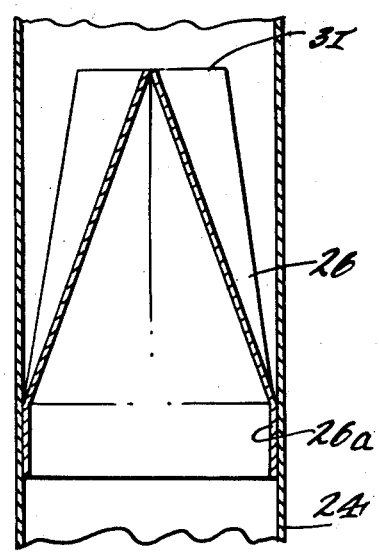
FIG. 4 is a view similar to FIG. 3, with the valve shown in closed position.
Figure 5:
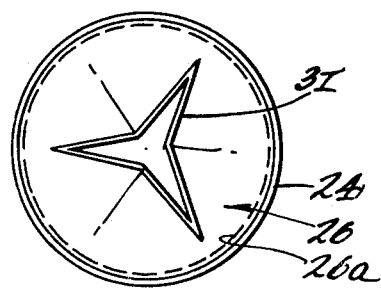
FIG. 5 is a top elevation of the valve shown in FIGS. 3 and 4.

Referring more particularly to FIG. 1, numeral 20 indicates the body of the hollow-shaped spherical artificial heart formed out of a pair of semi-spherical sections; the upper section 21 and the lower section 22. The upper section 21 is provided with a pair of tubular extensions 23 and 24 respectively which contain a pair of valves; one an inlet valve and the other an outlet valve, 25 and 26 respectively. The upper section 21 has in addition a circular flange 27 contacting a similar flange 28 formed in the lower section 22. Both sections, 21 and 22, by means of their respective flanges 27 and 28 form the body of the artificial heart. Both sections are made airtight by means of the threaded circular rings 29 and 30. The threaded ring 29 has an opening 29a which is smaller in diameter than the thread 29b in the ring 29, thus forming the circular shelf 29c. The threaded ring 30 has an opening 30a which is smaller in diameter than the thread 30b in the ring 29, thus forming the circular shelf 30c. Valves 25 and 26 are formed out of lengths of tubes 25a and 26a and have a star-shaped lip 31. The valve 25 is mounted into the tubular member 23 with its lip facing downwardly to open when blood is pumped through it, while the valve 26, mounted in the tubular member 24 faces with its lip upwardly to permit the exit of the fluid.

Referring to FIGS. 6 and 7, it can be seen that the artificial heart 20, by means of the threaded rings 30 and 29 (which in FIG. 6 are shown mounted in a substantially reversed position from the original position shown in FIG. 1) may be securely held to the supporting casting 29d. It may be seen that in this case the ring 30 is an integral part of the supporting casting 29d. The latter may be mounted to slide in the slot 33 which is machined in the upright frame 32 (see FIGS. 6 and 7). The casting 29d may be moved vertically, up or down by means of the gear rack 34 and the pinion 35. The latter is rotated manually by the knob 36 with a secondary knob 37 having a threaded portion 38 serving to locate the casting 29a on the upright frame 32. A pair of flexible rubber hoses 39 and 40 are secured to the extensions 23 and 24 by means of specially designed fixtures 41 to be described later.

At the extreme lower end the frame 32 is provided with a reciprocating plunger means consisting of an upright reciprocating shaft 43. The latter mounted in bearings 44 and 45 can be moved up and down. The upper portion of the shaft 43 carries a rubber button 46, while its lower end 47 has a bushing 48 with a hole 49. Right behind the shaft 43 there is a rotating disk 50 mounted to rotate in the bearing 51 in the frame 32. A shaft 52 and a reduced speed electric motor (not shown) turn the plate 50. An eccentrically mounted operating arm 53, by means of the pin 54 is mounted to the disk 50. With its opposite end the arm 53 is held to the bearing or the bushing of the shaft 43 by the pin 55.

From the above description it becomes obvious that when the plunger 42 is operated up and down it will contact the underside of the hollow lower section 22 to exert pressure in the fluid in the artificial heart. This action will close the valve 25 and will open the valve 26 allowing blood to leave the heart. Upon its further movement, when the plunger 42 clears the underside of the lower section 22, due to its resiliency the latter will expand and assume its original semi-spherical shape thus creating an empty space and a vacuum. The action of the vacuum thus created will close the valve 26 and will open the valve 25 allowing blood to enter the artificial heart. It can be seen that repetition of this cycle will create a continuous flow of blood.

In the event is is found necessary to change the delivery volume of the heart, the casting 29a is moved vertically bringing the under side of the lower section 22 closer or further away from the plunger 42. This action will limit or increase the amount of pressure exercised by the plunger upon the lower section 22 and accordingly change the suction and the amount of blood entering or leaving the artificial heart.

Referring more particularly to the fixtures shown in FIGS. 11 and 12, both consist of the elongated body 56 provided at either end thereof with clamps 57 and 58. The latter consist of ring-shaped members 59 held to the fixture 56 by means of the ridge 60 while ending at the opposite ends 61 with ears 62 and 63. A threaded knob 64 serves the purpose of tightening the ears 62 and 63 over a pipe or tubing "T" which may be inserted in the space "S" provided between the member 56 and the ears or clamps 57 and 58. FIG. 12 shows a similar fixture provided with a right-angle extension 65.

FIG. 8 is a modification showing the artificial heart mounted by means of the threaded ring 29 in a threaded portion 66 of the housing 67. The artificial heart is mounted in such manner as to face with its lower section 22 the plunger 42a. In this case the shaft 43a oscillates by the electric solenoid 68. To prevent excessive oscillation of the shaft 42a the device is provided with an air brake 69. The latter has a cylinder 70 provided with a needle valve 71 with a threaded stem 72. A piston 73 held by the extension 74 in the shaft 43a is mounted to slide in the cylinder 70 with a coil spring 75 mounted over the piston to apply pressure. The lower portion of the cylinder 70 of the air brake has a number of bleeder or vent holes 76.

From the above description of the device it becomes obvious that when current is delivered to the armature of the solenoid 68 the shaft 43a will tend to oscillate. The speed of the oscillation of the shaft is being controlled by the air brake 69 to such an extent as to permit its speed not to become greater than the rhythmic pulsating motion of the human heart. To contain the solenoid 68 in the housing 67, the latter is provided with a grooved portion 77 mounting the fastening ring 78.

What I claim is:

1. In a pump for artificial blood circulation comprising in combination, a base, a hollow spherical body having an upper and a lower hollow shell of flexible material in said base, each shell having a circular flange in the midriff thereof, the flange of one shell contacting the flange of the other shell, means to join the upper shell to the lower shell by their respective flanges to form said hollow spherical body, said upper shell having a pair of valves, an inlet and an outlet valve in said upper shell, said means to join said shells together facilitating the mounting of said upper and said lower shell to said base; a reciprocating plunger means in said pump mounted to reciprocate under said lower shell, the reciprocating motion of said plunger pressing said flexible lower shell to produce alternately pressure and suction in said pump to circulate the blood through said inlet and outlet valves.

2. An artificial heart pump comprising, in combination, a circular base, said base having a threaded portion exterior thereto, a threaded ring included and mounted over the threaded portion of said base, said ring having a centrally located circular opening, said opening being smaller in diameter than the thread in said ring and forming a circular shelf, a hollow spherical body in said base formed of a pair of semispherical hollow shells made of plastic material comprising an upper shell and a lower shell, each shell having a circular flange formed around its midriff and facing away from the shell, said lower shell being housed in said circular base, said upper shell being mounted above said lower shell with the circular flange of the upper shell contacting the circular flange of the lower shell, said upper shell passing through the circular opening in said ring, the flange of said upper shell contacting the circular shelf in said ring, the threading of said threaded ring to the thread in said circular base tightening said ring to said base to join by the medium of their respective flanges the upper shell to the lower shell together to form said hollow spherical body; inlet and outlet means in said pump including an inlet and an outlet valve in said upper shell, reciprocating means located externally of said flexible lower shell and contacting said shell, a solenoid coil in said pump, said means having a plunger mounted in said solenoid coil, said solenoid coil connected to an electric source, said plunger in said coil being given a pulsating reciprocating motion by said electric source in said coil, said pulsating plunger means pounding upon said flexible lower shell to flex said shell to alternately compress said shell to produce pressure and suction to operate said pump.

References Cited in the file of this patent

UNITED STATES PATENTS

| 285,477 | Garsed | Sept. 25, 1883 |
| 340,739 | Stohlman | Apr. 27, 1886 |
| 1,802,136 | Carter | Apr. 21, 1931 |
| 2,954,738 | Di Vette | Oct. 4, 1960 |

FOREIGN PATENTS

| 214,620 | Australia | Oct. 17, 1957 |

OTHER REFERENCES

Sirak et al.: "Cardiotomy Into an Empty Left Ventricle" from Surgery, vol. 28, No. 2, 1950, pp. 225–234.

Dennis et al.: "Development of a Pump-Oxygenator To Replace the Heart and Lungs; An Apparatus Applicable to Human Patients, and Application to One Case" from Annals of Surgery, vol. 134, No. 4, October 1951, pp. 706–721.